Feb. 16, 1960 N. V. BEAMAN 2,925,053
DOUGH SHAPER AND CONVEYOR
Filed May 21, 1958 4 Sheets-Sheet 1
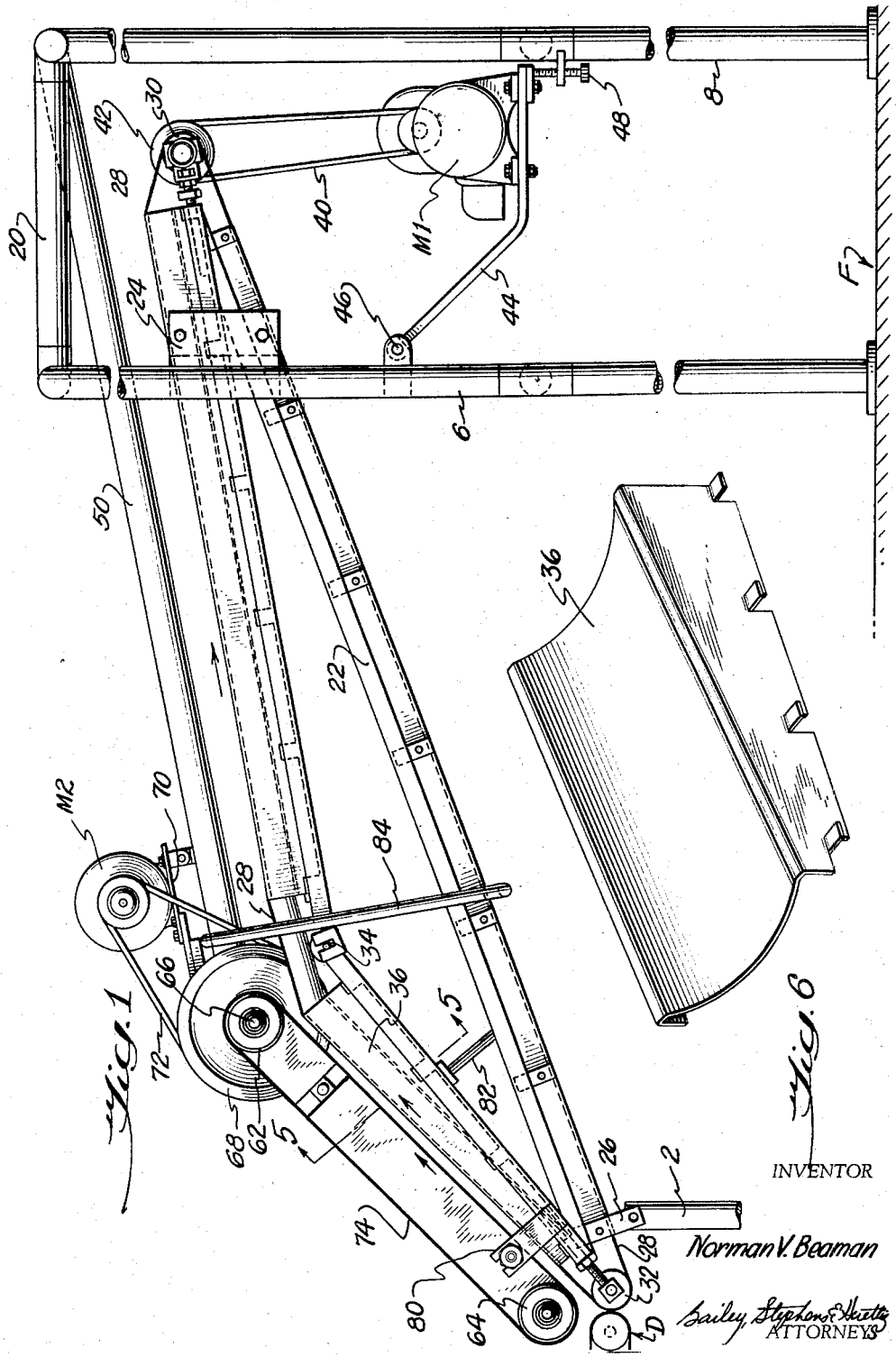
INVENTOR
Norman V. Beaman
Bailey, Stephens & Huettig
ATTORNEYS

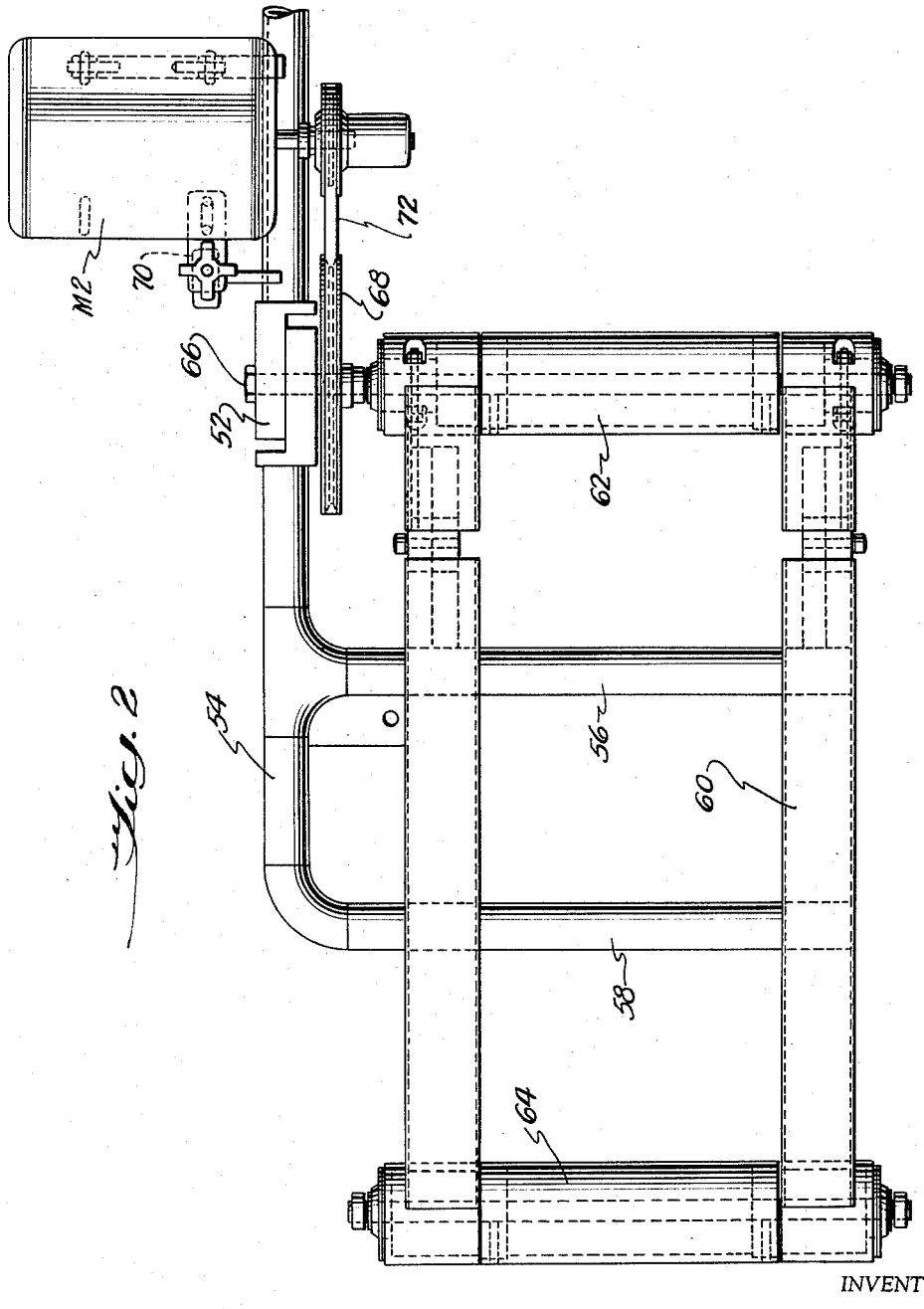

Feb. 16, 1960
N. V. BEAMAN
2,925,053
DOUGH SHAPER AND CONVEYOR
Filed May 21, 1958
4 Sheets-Sheet 3
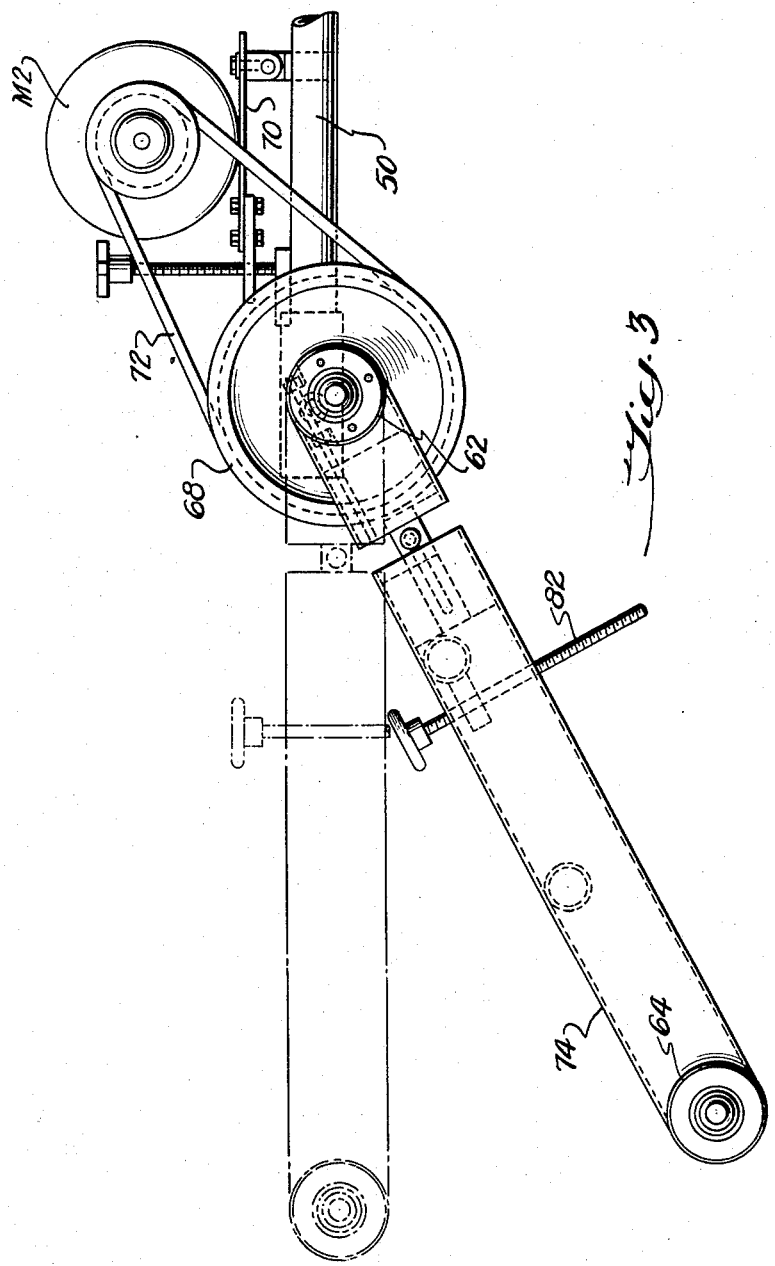
INVENTOR
*Norman V. Beaman*
BY *Bailey, Stephens E Huettig*
ATTORNEYS

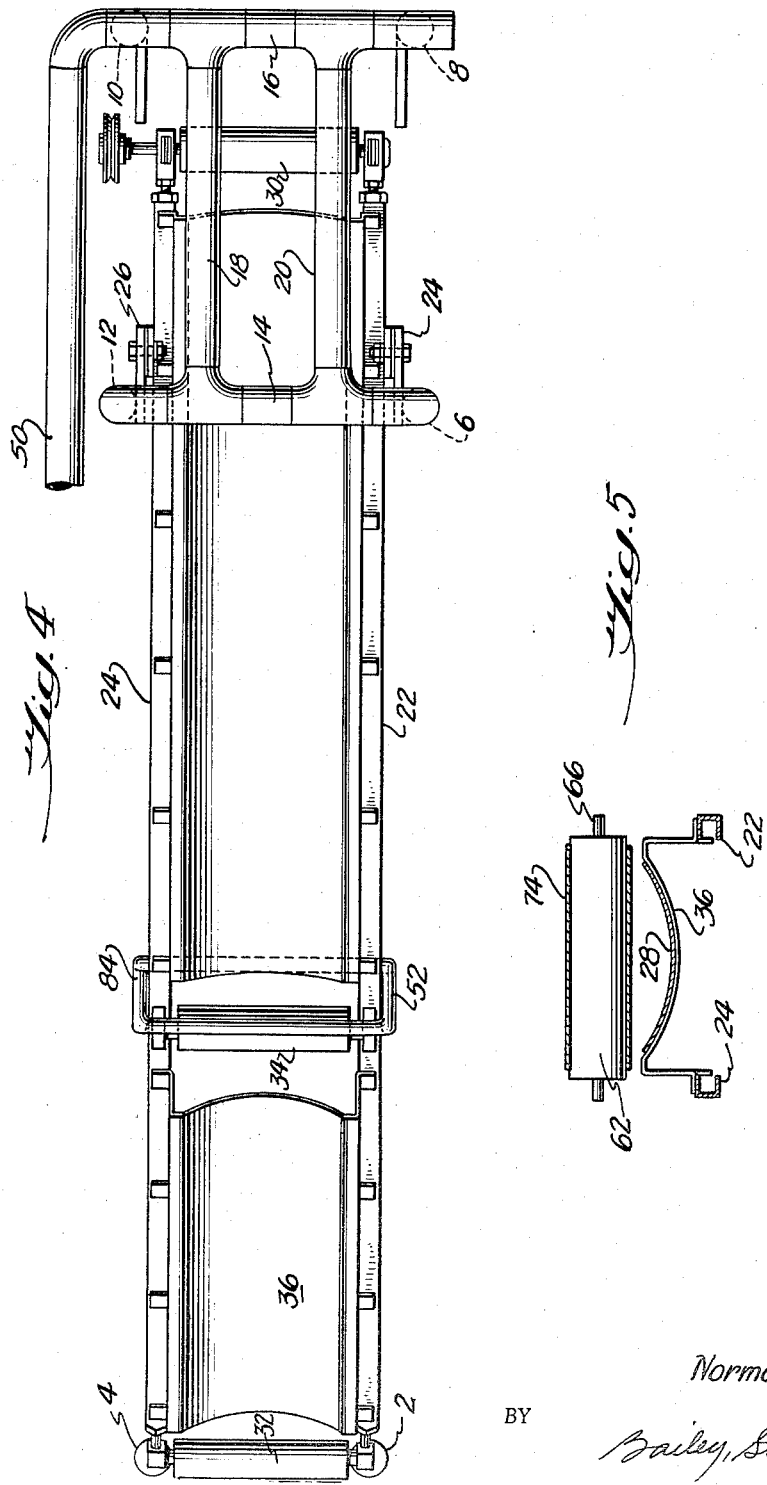

United States Patent Office 2,925,053
Patented Feb. 16, 1960

2,925,053

DOUGH SHAPER AND CONVEYOR

Norman V. Beaman, Cincinnati, Ohio, assignor to C. J. Patterson Company, Kansas City, Mo., a corporation of Missouri Application May 21, 1958, Serial No. 736,733

3 Claims. (Cl. 107—9)

This invention relates to dough handling apparatus for use in a commercial bakery and, in particular, is directed to a dough conveying unit which receives a plurality of dough pieces in rapid succession, separates and spaces the successive dough pieces from one another to facilitate subsequent handling of the dough, simultaneously conveys and elevates the dough pieces, shapes the dough pieces into generally round lumps, and dusts the dough pieces with flour.

The present dough shaper and conveyor is particularly adapted and intended for use in baking process as shown in Patterson Patent No. 2,869,484. Although the process aspect of the dough handling constitutes no part of this invention, a brief description of the process as contrasted with a conventional baking process will facilitate an understanding of the invention. In a baking process of the type disclosed in Patent No. 2,869,484, the ingredients are first blended, fermented and mixed to form a mass of dough which is then introduced into a divider to form the mass of dough into individual pieces of the correct weight for loaves of bread. The dough pieces discharged from the divider are then shaped into balls and are fed directly to a moulder which sheets and curls the dough pieces and deposits them into baking pans.

A process of this type is in sharp contrast to a conventional baking process in which the dough pieces discharged from the divider are first fed to a rounder which shapes them to ball form. The ball dough pieces discharged from the rounder are conveyed to a loading device which feeds them to an overhead proofer. The overhead proofer is composed of a series of trays, or the like, carried on movable chains which raise the dough pieces to a height of ten or twelve feet, where the dough pieces are slowly moved back and forth along conveyors before they are discharged onto another conveyor belt which conveys them to the moulder. It is common practice in a conventional bakery to provide another dough piece separating or spacing device at the moulder for properly spacing the dough pieces as they are fed to this machine. A typical device of this type is shown in Liebelt Patent No. 2,765,065.

One of the advantages of the new baking process, as compared to the conventional process, is the elimination of the rounder and overhead proofer. This not only reduces the manpower required to supervise the operation of these machines, but in addition facilitates a substantial reduction in the building space required for the production of bread.

However, the elimination of these devices and the auxiliary equipment described above presents a novel problem, for dough pieces are normally discharged from the divider at a relatively low height above floor level, two or three feet for example, while the receiving rolls of a moulder are disposed at a height of from six or seven feet, for example, in order to position the pieces for delivery through the remaining machine operations. Thus, in mechanically carrying out the new process, it is necessary to do four things to the dough pieces between the time they emerge from the divider and the time they are fed to the moulder. First of all, the dough pieces must be shaped or formed into balls for proper handling in the moulder. Secondly, the dough pieces must be elevated several feet while conveyed a short horizontal distance between the divider and moulder. Thirdly, the dough pieces must be spaced from one another to eliminate "doubles," and finally, the dough pieces must be dusted with flour to facilitate subsequent handling in the moulder.

The principal object of this invention is to provide one simple unit adapted to perform simultaneously each of these functions. More particularly, the present invention is predicated upon the concept of having a conveyor comprising a highly inclined lower or dough piece supporting belt disposed to receive dough pieces from the discharge end of a divider belt. The inclined support belt cooperates with a second, overlying belt which is positioned in spaced relationship above the support belt and travels at a differential speed relative to the lower belt, preferably at a substantially higher speed than the support belt. As the dough pieces leave the divider belt, they are positively gripped between the upper and lower conveyor belts. Due to the fact that both of these belts are moving at a substantially higher rate of speed than the divider belt, each piece is snatched away from the succeeding one so that the spacing between the pieces is increased.

In the preferred embodiment, the upper belt is driven at a higher rate of speed than the lower belt so that as the pieces are carried up the lower belt they are also rotated or turned and also dusted. This action functions to shape the pieces and to increase further the spacing between successive pieces. Thus the upper belt not only functions to shape the pieces, but also facilitates the separation and spacing of the pieces. And equally importantly, the upper belt cooperating with the lower belt functions to grip the pieces positively as they are elevated, so that the dough pieces are rapidly elevated in a minimum amount of linear floor space.

One of the principal advantages of the conveyor unit is that it is of extremely simple construction and yet efficiently performs a number of functions which previously required several complicated pieces of equipment to perform. Another advantage of the conveyor unit is that it is extremely compact and thus helps to minimize the floor space required by the process equipment. A further advantage is that the conveyor unit is inherently useful as a simple machine in the conventional process for transferring dough pieces from a divider to an overhead proofer.

A still further advantage of the conveyor unit is that it is constructed so that the functions performed by the unit are mutually complementary; that is, the components of the device, while performing one of the functions, at the same time inherently facilitate the performance of the other functions of the device. Specifically, the upper belt, while imparting the rolling motion to the dough pieces necessary to shape the pieces, at the same time facilitates the dusting and spacing of the pieces, and additionally provides the positive support which makes possible the elevation of the lumps at a much greater angle to the floor than would otherwise be possible.

The means by which the objects of the invention are obtained are described more fully with reference to the accompanying drawings, in which:

Figure 1 is a side elevational view of the invention;

Figure 2 is a plan view of the left side portion of Figure 1 with the upper belt not shown for purposes of clarity;

Figure 3 is a side elevational view of Figure 2;

Figure 4 is a plan view of Figure 1 with the upper belt frame removed;

Figure 5 is a cross-sectional view on the line 5—5 of Figure 1; and

Figure 6 is a perspective view of a pan placed beneath a portion of the lower belt.

As shown in Figures 1 and 4, the forward or inlet end of the apparatus is supported by a pair of vertical posts 2 and 4 while the outlet end of the conveyor is supported by four posts 6, 8, 10 and 12. These latter posts are joined at their upper ends by transverse braces 14 and 16, and longitudinal braces 18 and 20 to form a rigid structure resting upon the floor F. A pair of triangular frames 22 and 24 are attached to uprights 6 and 12, respectively, by brackets 24 and 26. The inlet end of the frame is likewise attached to posts 2 and 4 by brackets 26. This triangular frame carries the lower endless belt 28 which extends over drive roller 30 beneath the bottom of the frame and around idler roller 32 upwardly across a forwardly inclined portion of the frame and over idler roller 34 back to drive roller 30. A curved pan 36 rests upon the inclined portion of the frame beneath belt 28 to give additional support to the belt at this point.

Drive roller 30 is driven by a motor M1 through suitable gearing and a belt 40 extending between the motor and sheave 42 attached to roller 30. The motor is supported on a shelf 44 having one end secured by a hinge 46 to posts 6 and 8 and having the other end supported by an adjustable screw 48 fastened to post 8.

To support the upper conveyor belt, a beam 50 is secured at one end to the upper end of post 10 and at its other end to an adjustable joint 52 from which a second beam 54 extends, with the latter beam supporting transverse beams 56 and 58. These beams extend through the rectangular frame 60 which has at its ends a belt drive roller 62 and an idler roller 64, respectively. The shaft 66 of drive roller 62 forms the axis of joint 52 and also the journal for a driven sheave 68. A bracket 70 mounted on beam 50 carries motor M2 which drives sheave 68 by means of belt 72. An upper belt 74 extends around rollers 62 and 64. The inlet end of frame 60 is adjustably mounted on the lower triangular frame by means of a slotted bracket 80. This permits the upper belt 74 being spaced from lower belt 28 by means of the adjusting screw 82.

A rectangular bracket 84 is welded to the lower triangular frame to form a guide for the belt 28.

In operation, the lower belt is driven by motor M1 at a speed ranging from about 100 to 176 feet per minute. Motor M2 drives the upper belt at, at least, twice this speed, and preferably from 275 to 506 feet per minute, with the parallel reaches of adjacent portions of the belt travelling in the same direction as indicated by the arrows on the inclined parallel portions of the belt as shown in Figure 1. Pieces or lumps of dough are fed to the inlet end of the upper and lower belts from the conveyor D coming from a dough divider. The dough pieces, which may be just previously dusted with flour are seized between the lower and upper belts and are conveyed upwardly between the two belts. As upper belt 74 travels faster than lower belt 28, the dough is rolled and shaped by being moved by the upper belt upon the lower belt 28. The length of the adjacent portions of belts 28 and 74 is such as to rotate the dough piece at least 360° so that the dough piece is rounded when discharged from beneath upper roller 62 and carried forwardly on the uncovered portion of belt 28 from which it is discharged onto a further conveying device not shown and not a part of this invention. As the divider belt D is travelling at a lower speed of 10 and 20 feet per minute, the belts 28 and 74 further serve to space the dough pieces coming from the conveyor a greater distance apart than they were on the conveyor D. The apparatus not only shapes the dough pieces, but has the further function of being able to elevate the dough pieces upwardly a greater distance above the floor F so that the dough pieces are in a position to be handled by subsequent processing equipment. All depending upon the type of dough being handled and the size of the pieces, the distance between belts 28 and 74 can be adjusted. As the upper belt 74 exerts a pressure on the lower belt 28 through the dough pieces, curved pan 36 serves to limit the degree of sagging of the lower belt so that a proper shaped piece of dough is formed.

This apparatus has been found to be of inexpensive construction and very rapid and efficient in both shaping and transferring pieces of dough.

Having now described the means by which the objects of the invention are obtained, I claim:

1. A dough shaper and conveyor adapted to receive a succession of dough pieces from a feed belt comprising a lower endless belt extending upwardly at an angle to the horizontal, an upper belt extending substantially parallel to the lower belt and spaced from the lower belt a distance to contact a piece of dough disposed between the belts, the lowermost inlet end portions of said upper and lower belts being in substantial vertical alignment with one another for seizing a piece of dough from a feed belt and separating the piece from a following piece of dough, a curved supporting pan beneath the lower belt portion coextensive with the upper belt for curving the lower belt during the shaping of the dough piece, and motor means for driving said belts in the same direction and with the upper belt moving at a substantially faster rate than said lower belt for rolling and shaping the dough piece between the belts as the dough piece is conveyed upwardly.

2. A dough shaper and conveyor as in claim 1, further comprising said lower belt extending beyond the outlet end of said upper belt at a lesser angle to the horizontal.

3. A dough shaper and conveyor as in claim 2, further comprising a triangular frame for carrying said lower belt, a pair of posts supporting the inlet end of said frame, a group of four posts supporting the outlet end of said triangular frame, an upper belt frame, bracket means for supporting the inlet end of said upper frame upon said triangular frame, and arm means cantilevered from said group of four posts for supporting the outlet end of said upper belt frame.

References Cited in the file of this patent

UNITED STATES PATENTS

| | | |
|---|---|---|
| 777,335 | Dietz | Dec. 13, 1904 |
| 1,169,472 | Embrey | Jan. 25, 1916 |
| 1,824,759 | Bainbridge | Sept. 29, 1931 |
| 1,954,501 | Steere | Apr. 10, 1934 |
| 2,293,109 | Bridge | Aug. 18, 1942 |